July 17, 1951          H. J. GERBER          2,561,020
INSTRUMENT FOR MEASURING, INTERPOLATING AND THE LIKE
Filed May 20, 1946                            4 Sheets—Sheet 1

INVENTOR.
HEINZ JOSEPH GERBER
BY
S. Jay Teller
ATTORNEY

July 17, 1951  H. J. GERBER  2,561,020
INSTRUMENT FOR MEASURING, INTERPOLATING AND THE LIKE
Filed May 20, 1946  4 Sheets-Sheet 2

INVENTOR.
HEINZ JOSEPH GERBER
BY S. Jay Teller
ATTORNEY

July 17, 1951  H. J. GERBER  2,561,020
INSTRUMENT FOR MEASURING, INTERPOLATING AND THE LIKE
Filed May 20, 1946  4 Sheets-Sheet 4

INVENTOR.
HEINZ JOSEPH GERBER
BY
S. Jay Teller
ATTORNEY

Patented July 17, 1951

2,561,020

UNITED STATES PATENT OFFICE 2,561,020

INSTRUMENT FOR MEASURING, INTERPOLATING, AND THE LIKE

Heinz Joseph Gerber, Hartford, Conn., assignor to The Gerber Scientific Instruments Company, Hartford, Conn., a corporation of Connecticut Application May 20, 1946, Serial No. 671,019

25 Claims. (Cl. 33—41)

The invention relates to instruments adapted to be used by draftsmen, engineers, scientists and others for a variety of purposes. An instrument embodying the invention has a graduated element adjustable in length, and this element may be graduated uniformly or it may be graduated nonuniformly in accordance with a predetermined pattern, as for instance in accordance with a logarithmic scale. The instrument may be used as an adjustable draftsman's scale for making drawings on any reduced or increased scale within the range of the instrument, or for subdividing established distances or dimensions, or for interpolating intermediate points in plotting charts or graphs, or for various other purposes. One of the uses of an instrument embodying the invention is the drawing of parallel lines variously spaced according to the setting of the instrument.

The general object of the invention is to provide several forms of instruments adapted for purposes such as those stated, and having various novel and advantageous features which are fully shown in the accompanying drawings and described in the following specification and claims.

In the drawings I have shown several embodiments of the invention, but it will be understood that various changes may be made from the constructions illustrated and that the drawings are not to be construed as defining or limiting the invention, the claims forming a part of this specification being relied upon for this purpose.

Schematic illustrations—Figs. 1 to 9

Figures 1, 2:
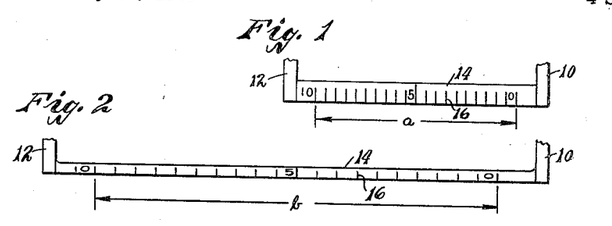
Fig. 1 is a schematic view of a simple embodiment of the invention.
Fig. 2 is a view similar to Fig. 1 but showing a different position of adjustment.

In the simple embodiment of the invention shown in Figs. 1 and 2, 10 and 12 represent respectively two suporting members, one of which is movable longitudinally relatively to the other. The member 10 may be regarded as a fixed member and the member 12 may be regarded as longitudinally movable relatively thereto. Extending between the members 10 and 12 and engaged therewith is a longitudinally extending resilient element 14 which is so formed and which is so engaged with the members 10 and 12 that its length may be varied when the relatively movable member 12 is moved. As illustrated, the element 14 may be formed of material such as rubber which can be elongated within reasonable limits upon the application of tension thereto, all portions of the said element from end to end thereof being varied in length when the total length is varied. The element 14 is provided with graduations 16 which are longitudinally spaced in conformity with a predetermined pattern. The said predetermined pattern may be widely varied, but as shown, the graduations 16 are uniformly spaced. When the element 14 is in its substantially relaxed position, as shown in Fig. 1, there is a definite number of graduations for a given unit of length such as $a$, as for instance ten graduations. Some of the graduations 16 are definitely marked so as to be readily distinguished from other graduations. As shown, some of the graduations have appropriate numerical markings and the intervening graduations are unmarked. A series of graduations wherein some are differently marked to distinguish them from others will be herein referred to as "differentially marked graduations."

When the relatively movable member 12 is moved to a position such as that shown in Fig. 2, the resilient element 14 is elongated and the spacings between the several graduations 16 are proportionately elongated. As shown, the member 12 has been moved to such an extent that the distance $b$ between the end graduations is twice the distance $a$ shown in Fig. 1. The spacing between each two graduations in Fig. 2 is twice the spacing between each two graduations in Fig. 1. It will be understood that for any position of the member 12 within the limits of the instrument the spacings between the graduations are exactly proportionate to the total amount of elongation.

Figure 3:
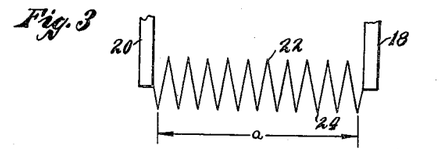
Fig. 3 is a schematic view similar to Fig. 1 but showing an alternative embodiment of the invention.

For various reasons it is not ordinarily practicable to use a material such as rubber for the extensible element of the instrument. One of the reasons is that rubber is subject to relatively rapid deterioration and it may not be exactly uniform in quality so that all portions thereof will extend exactly proportionately. Instead of using a material such as rubber I ordinarily prefer to use a coil spring formed of resilient metallic wire. In Fig. 3 supporting members 18 and 20 are shown which are similar to the members 10 and 12. The longitudinally extending resilient element is a coil spring 22 having its convolutions spaced in conformity with a predetermined pattern. The convolutions of the spring at one side thereof, as for instance the front side, as indicated at 24, constitute the graduations. As shown, the convolutions are such as to provide ten equal spaces within the distance $a$. It is not ordinarily feasible to apply numerical designations to the convolutions constituting the graduations, but markings other than numerical may be applied to the convolutions, as will be hereinafter described. When provided with such other markings, the convolutions of the spring constitute differentially marked graduations.

Figure 4:
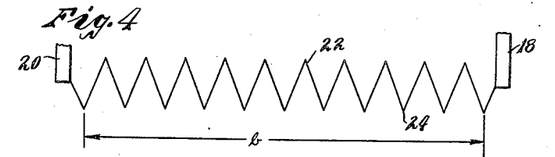
Fig. 4 is a view similar to Fig. 3 but showing a different position of adjustment.

In Fig. 4 the member 20 has been moved to increase the length of the spring 22 so that the distance $b$ between the end convolutions is twice the distance $a$. The spacing between each two adjacent convolutions 24 is twice the spacing between each two adjacent convolutions as shown in Fig. 3. It will be understood that for any position of the member 20 within the limits of the instrument the spacings between the convolutions 24 are exactly proportionate to the total amount of elongation.

Figure 5:
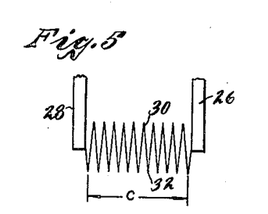
Fig. 5 is a schematic view similar to Fig. 3 but showing another alternative embodiment of the invention.

In the constructions shown in Figs. 1 and 2 and in Figs. 3 and 4 the longitudinally extending resilient element is elongated from its initial or relaxed position to increase the spacings between the graduations. This is ordinarily preferred, but it may in some instances be more desirable to provide a resilient element which can be compressed rather than elongated. In Fig. 5 I have shown supporting members 26 and 28 similar to the members 10 and 12 and similar to the members 18 and 20. A resilient element 30 is provided which is a coil spring similar to the spring 22, but the movable member 28, instead of being moved to elongate the spring, is moved to compress the spring. As shown in Fig. 5, the member 28 has been moved to compress the spring so that the distance $c$ between the end convolutions is one-half the distance $a$ shown in Fig. 3. It will be seen that the spacing between each two adjacent convolutions 32 is one-half the distance between each two convolutions 24, as shown in Fig. 3.

While the resilient member may be either elongated or shortened from an initial relaxed position, there is in either case an increase in the total length of the resilient member when the relatively movable supporting member is moved away from the position of shortest length. Therefore, for convenience of description, the resilient member will be referred to as "extensible" and as being increased in length upon movement of the relatively movable supporting member in one direction. It necessarily follows that the resilient member is decreased in length upon movement of the relatively movable supporting member in the opposite direction.

Figures 6, 7:
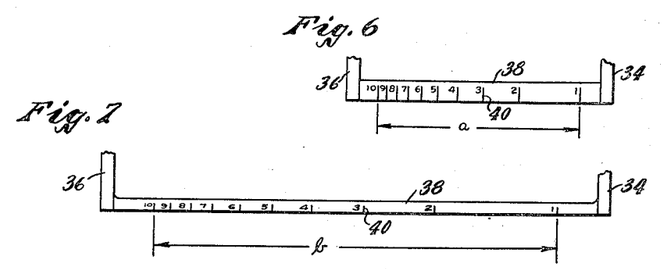
Fig. 6 is a schematic view similar to Fig. 1 but showing another alternative embodiment of the invention.
Fig. 7 is a view similar to Fig. 6 but showing a different position of adjustment.

Figs. 6 and 7 show a construction similar to that shown in Figs. 1 and 2 except that the graduations are differently spaced. Supporting members 34 and 36 are provided which are similar to the supporting members 10 and 12, and a longitudinally extending resilient element 38 is provided which is similar to the element 14. The element 38 is provided with graduations 40 which, instead of being uniformly spaced, are spaced nonuniformly in accordance with a predetermined pattern or formula. As shown, the graduations 40 are spaced in accordance with a logarithmic scale, but the invention is not so limited. Within the distance $a$ the graduations may run from 1 to 10 as shown. As shown, all of the graduations are numerically marked and the element 38 therefore has differentially marked graduations.

When the member 36 is moved to elongate the element 38, as for instance to the position shown in Fig. 7, all portions of the element 38 from end to end thereof are elongated exactly proportionately to the amount of total elongation. As shown, the elongation is such that the distance *b* between the end graduations is twice the distance *a*. Inasmuch as all portions of the element 38 are uniformly elongated in proportion to the total elongation it follows that the distance between each two graduations is elongated proportionately to the total elongation, and that the ratios of the spacings between the several graduations remain constant.

Figure 8:
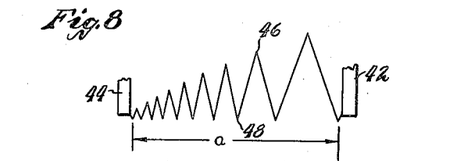
Fig. 8 is a schematic view similar to Fig. 6 but showing another alternative embodiment of the invention.
Figure 9:
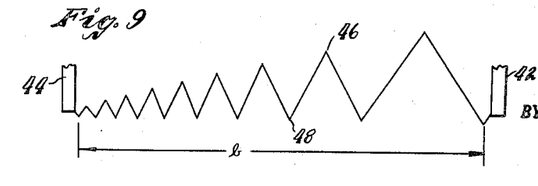
Fig. 9 is a view similar to Fig. 8 but showing a different position of adjustment.

For reasons already stated it is ordinarily preferable to use an extensible element consisting of a coil spring, and this is shown in Figs. 8 and 9. The supporting elements are similar to those shown in Figs. 6 and 7 and are designated as 42 and 44. The extensible coil spring is designated 46 and the convolutions of the spring at one side thereof, as indicated at 48, constitute the graduations. Due to the fact that the spacings between the convolutions 48 are not uniform a special problem arises which was not encountered in the somewhat similar construction shown in Figs. 3 and 4. It is necessary for the spacing between each two adjacent convolutions to be varied exactly proportionately to variations in total length, and it is therefore necessary to construct or form each individual convolution in such a manner that the desired variation in spacing will be produced. This result may be attained in various ways, but preferably the several convolutions are of successively different sizes as shown. It will be understood that the drawing does not necessarily represent the exact variations in the sizes of the convolutions, and that it is merely necessary for the convolutions to be so formed as to attain the desired uniformity in the ratios of the spacings when the spring is elongated. Fig. 9 shows the supporting member 44 moved to a position such that the distance *b* between the end convolutions is twice the distance *a* shown in Fig. 8 and it will be seen that the distance between each two adjacent convolutions in Fig. 9 is exactly twice the distance between the same two convolutions in Fig. 8. It will be understood that for any position of the member 44 within the limits of the instrument the increases in the spacings between the several convolutions 48 are exactly proportionate to the total amount of elongation.

*Instrument shown in Figs. 10 to 17*

Figures 10, 11:
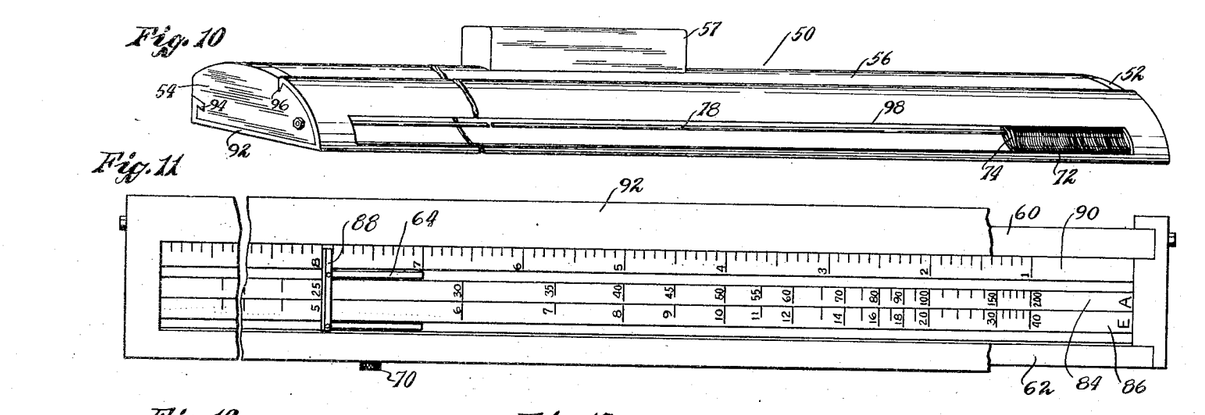
Fig. 10 is a perspective view of an instrument embodying the invention, the construction being somewhat similar to that shown schematically in Figs. 3 and 4.
Fig. 11 is a bottom view of the instrument as shown in Fig. 10.
Figures 12, 13, 14, 15, 16, 17:
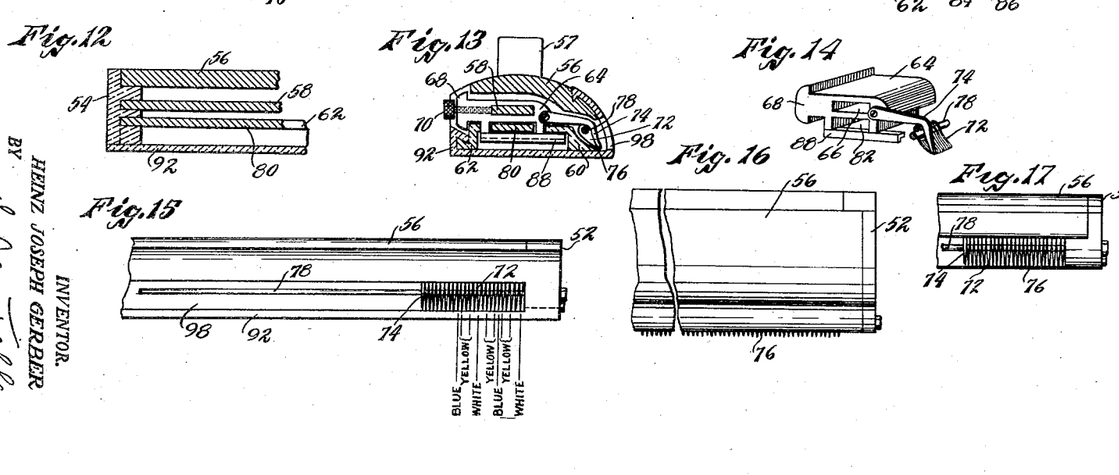
Fig. 12 is a fragmentary longitudinal vertical sectional view through the left end portion of the instrument shown in Fig. 10.
Fig. 13 is a transverse vertical sectional view of the instrument shown in Fig. 10.
Fig. 14 is a perspective view of some of the parts of the instrument shown in Fig. 10.
Fig. 15 is a fragmentary front view of the right end portion of the instrument as shown in Fig. 10, with the parts in different positions of adjustment.
Fig. 16 is a plan view of the instrument as shown in Fig. 15 with the shield removed.
Fig. 17 is a front view of the instrument as shown in Fig. 16.

Fig. 10 shows an instrument embodying the invention and similar in principle to the schematic showing in Figs. 3 and 4. This instrument is designated in its entirety by the reference character 50. The instrument 50 comprises a base preferably having a flat bottom face and preferably formed of several connected parts. Irrespective of the shape of the base, one direction therealong will be designated as a "longitudinal" direction. As shown, the base is elongated in the longitudinal direction and comprises two similar spaced end members 52 and 54. The end members 52 and 54 are connected by a longitudinal cover 56 which may carry a handle 57. The base is provided with a suitable longitudinal guideway which is preferably in the form of a guide rail 58. The guide rail is below the cover 56 and is engaged with the end members 52 and 54, as for instance by being seated in recesses therein as shown in Fig. 12. The base preferably also comprises front and rear rails 60 and 62, as shown in Fig. 13, which are suitably connected with the end members. A longitudinally movable slide 64 is provided which is guided by the guideway and when the guideway is in the form of a rail 58 the slide 64 has a longitudinal opening 66 therein which receives and fits the guide rail. The slide 64 has a projection 68 at the rear which can be manually engaged for moving the slide along the rail. A clamping screw 70 is provided on the slide and the inner end of this screw is engageable with the rail to clamp the slide in any position to which it may be moved.

A longitudinally extending extensible spring 72 is provided corresponding in function to the spring 22 shown in Figs. 3 and 4. This spring is connected at its right end to the end member 52 which constitutes a supporting member corresponding to the member 18 shown in Figs. 3 and 4. The spring 72 is connected at its left end with an arm 74 connected with or formed as a part of the slide 64, the slide and arm constituting a movable supporting member corresponding in function to the member 20 shown in Figs. 3 and 4. The spring 72 is shown as being a coil spring, and a spring of this type is ordinarily preferable. It will be observed that the front rail 60 is formed to provide a recess at the front of the base and that the spring 72 is positioned in this recess between the said rail 60 and the cover 56. The upper surface of the rail 60 is transversely inclined and it constitutes the bottom wall of the recess.

The convolutions of the spring 72 are not circular but are so formed or shaped as to provide transversely narrow graduation portions 76 which are longitudinally aligned. The said graduation portions 76 are preferably sharply bent to form corners. The spring is so located with respect to the base and the slide that the sharp graduation portions 76 are closely adjacent the front edge of the base and closely adjacent the bottom plane of the base, being thus conveniently accessible. The upper front portions of the convolutions are substantially straight and are inclined upward and rearward from the said narrow or sharp graduation portions 76. This upward and rearward inclination facilitates observation of the graduation portions, particularly when viewed from the top.

As shown, the convolutions of the spring are generally ovoidal in shape. The upper front portions of the convolutions extend upward and rearward from the narrow graduation portions as has been stated, and the lower rear portions of the convolutions also extend upward and rearward from the said graduation portions. The said upper and lower portions diverge rearwardly. The graduation portions 76 are shown as projecting slightly beyond the front edge of the rail 60 and beyond a vertical plane through the front edge of the cover 56.

It will be observed that the movable end of the spring 72 is connected with the slide 64 at the end thereof which is remote from the fixed end of the spring. Thus the slide does not extend to any substantial extent beyond the movable end of the spring and the overall length of the instrument is kept at a minimum.

A longitudinal rod 78 preferably extends through the convolutions of the spring 72. This rod does not ordinarily engage the convolutions of the spring and is provided merely as a safety device to hold the spring approximately in place in the event of severe vibration or shock applied to the instrument.

The spacing of the convolutions in the spring 72 may be widely varied, but as shown, the spring 72 is formed of very small wire so that there may be a large number of convolutions per unit of length when the spring is in its initial relaxed position. As shown in Fig. 10, there are intended to be 200 convolutions in one inch of spring length although this large number cannot be actually shown in the drawing. When there are 200 convolutions I prefer to use a wire having a diameter of 5 mils and to so wind the wire that the convolutions of the spring are initially in direct engagement with each other. In describing the convolutions and the graduations as "spaced," reference is had to the spacing between the center lines of the convolutions, and the convolutions may be in contact with each other as stated.

The several convolutions of the spring 72, particularly the portions 76 thereof, serve in and of themselves as graduations indicating linear spacing, but I prefer to provide markings on at least some of the convolutions so that they can be more readily distinguished from each other in the use of the instrument. As indicated in Fig. 15, some of the convolutions are suitably colored to distinguish them from other convolutions. One kind of graduation marking may be placed on every convolution corresponding to multiples of a predetermined number, and a different kind of graduation marking may be placed on intermediate convolutions corresponding to fractions of the said predetermined number. For example, each tenth convolution may be colored white, each intermediate fifth convolution may be colored blue, and each intermediate second convolution may be colored yellow. The said colored markings on some of the convolutions provide differentially marked graduations.

It may sometimes be preferable to provide markings other than decimal markings. For instance, one color of marking may be provided for every eighth convolution, another color may be provided for each intermediate fourth convolution, and another color may be provided for each intermediate second convolution. With such markings, the number of convolutions per inch with the spring at minimum length might advantageously be 64 or 128.

When the clamping screw 70 is disengaged the slide 64 can be moved along the guide rail 58 so as to elongate the spring 72 to any desired extent within the limits of the instrument, and by means of the screw the slide may be held in its adjusted position. In order to conveniently determine or show the relationship between the position of the slide and the number of spring graduations per unit of length, one or more longitudinally graduated reciprocal scales are provided on the instrument. While the scale or scales may be variously located, I have shown them at the back of the instrument so that they face downwardly. As shown in Figs. 11, 12 and 13, the base carries a rail 80 immediately below the guide rail 58 and below the slide 64 which is shown as having a notch 82 therein for receiving the rail. The ends of the rail 80 are suitably mounted in the end members 52 and 54. Inscribed upon or otherwise applied to the rail 80 is at least one longitudinal scale, and as shown, there are two such scales respectively designated as 84 and 86. The slide 64 carries a cross bar 88 which cooperates directly with the scales and when the spring 72 is at its minimum length the cross bar 88 is at the starting point of the scales at the right. In addition to the scales 84 and 86 there may be provided another scale 90 located on the under side of the front rail 60 and this scale is calibrated to read directly in units of length, as for instance in inches.

Figs. 11, 15, 16 and 17 show the slide 64 moved to a position wherein the total length of the spring is eight times as great as shown in Fig. 10. This is indicated by the setting of the cross bar 88 at "8" on the inch scale 90. The 200 convolutions of the spring, instead of being concentrated in a one inch space, are distributed through a space of eight inches, thus providing 25 convolutions per inch instead of 200 convolutions per inch. The number of convolutions per inch can be read directly on the scale 84 and it will be seen that the cross bar or indicator 88 is at the point on the scale 84 corresponding to 25. Thus the scale 84 shows directly the number of convolutions per inch for any given setting of the slide 64. The scale 86 is similar to the scale 84 but the numerical markings thereon have one-fifth of the values of the markings on the scale 84. Thus the scale 86 indicates the number of graduations per inch when every fifth graduation is regarded as a unit, the intermediate graduations being ignored. Every fifth graduation is colored white or blue as already stated.

Scales other than the scales 84 and 86 may be substituted, and these scales may designate the number of graduations per inch when every graduation is considered as two units, or when every second graduation is considered as a unit, or when every tenth graduation is considered as a unit.

Under some conditions there may be a tendency for the spring 72 to sag by reason of gravity. This may cause the convolutions to drag on the rail 60 and may throw them out of the straight line which is desirable for close accuracy. To avoid such sagging the before-mentioned cover 56 may be formed of magnetic material which is magnetized to form a magnet having one pole thereof along the front edge immediately above the recess in which the spring 72 is positioned. With the spring 72 formed of steel wire as is ordinarily preferred, the magnetic force exerted by the magnet tends to draw the spring 72 upward, thus eliminating or at least minimizing any tendency thereof to sag. When the cover 56 constitutes a magnet the other parts of the base are preferably formed of nonmagnetic material.

It may be desirable to provide the instrument 50 with a shield for protecting the delicate spring 72, this shield being preferably readily removable to facilitate use of the instrument. As shown, there is a shield 92 which extends through the entire length of the base and which partly surrounds the base as clearly shown in Fig. 10. A portion of the shield extends across the bottom of the base and other portions engage the sides of the base, being provided with tongues 94 and 96 which fit longitudinal grooves in the base. The shield 92 is longitudinally movable with respect to the base so that it can be readily removed when desired. It is not always necessary to remove the shield before the instrument is used, and in order that limited access may be had to the spring 72 with the shield in place, the shield is provided with a longitudinal opening 98 immediately adjacent the recess in which the spring 72 is located. The shield 92 may be formed of transparent material so that the scales at the bottom are readily visible. Alternatively, it may be formed of opaque material and if so formed it must be provided with a longitudinal opening in the bottom thereof in order that the scales may be observed with the shield in place.

The instrument 50 has various uses. It may for instance be used by a draftsman for conveniently providing any desired number of subdivisions of a given linear dimension. With the instrument set at the position shown in Fig. 10 the graduations on the spring 72 provide 200 subdivisions of an inch when every graduation is considered. When every second graduation is considered there are 100 subdivisions per inch, when every fifth graduation is considered there are 40 subdivisions per inch, and when every tenth graduation is considered there are 20 subdivisions per inch. By properly setting the slide 64 as indicated by the scales 84 and 86, the number of graduations per inch can be reduced to any desired number within the limits of the instrument. The number of graduations can be transferred from the instrument to a drawing by means of dividers or otherwise. The instrument may be used as described with the removable shield 92 in place.

When the shield 92 is removed the instrument may be used by a draftsman and placed directly on a drawing for use as a drafting scale. In this case the narrow graduation portions 76 of the convolutions of the spring are very close to the paper and the readings of the graduations on the spring can be transferred directly to the paper in the same manner as with any draftsman's scale. With this instrument it is not necessary for the draftsman to have a number of different drafting scales which have to be substituted for one another, but in lieu thereof the draftsman can use the one instrument, changing the setting thereof from time to time as may be necessary for the particular drafting work required to be done. For instance, if a drawing is to be made half size the indicator 88 can be set at 20 on the scale 84 thus providing twenty divisions per inch, or ten divisions per half inch. If a drawing is to be made one-quarter size, the indicator 88 can be set at 40 on the scale 84 thus providing forty divisions per inch or ten divisions per quarter inch.

If it is desired to reproduce a drawing on a reduced or increased scale having an unusual ratio to the original, it is unnecessary to use proportional dividers as is now customary. It is merely necessary to set the instrument at the desired ratio thus providing in effect a draftsman's scale having the desired ratio of reduction or increase.

The instrument can also be used for photographically producing a printed scale having any desired ratio to a full size scale. For this purpose the instrument is preferably used in conjunction with the apparatus disclosed in my copending but abandoned application for Apparatus for Making Printed Scales, Serial No. 671,018, filed on even date herewith.

The instrument can also be advantageously used for subdividing any given distance on a drawing, between two points or between two lines, into any desired number of subdivisions. For instance, if two points on a drawing are spaced apart by some uneven distance, perhaps approximating five inches, this distance can be divided into 100 parts by placing the right hand convolution of the spring on one point and by adjusting the spring so that the midway convolution thereof is on the other point.

It is frequently desirable in plotting charts or graphs to interpolate intermediate points between two established points. This can readily be accomplished by locating and adjusting the instrument so that two selected convolutions are in register with the said established points, the adjustment being such as to provide a required number of convolutions between the said selected convolutions.

Many other uses of the instrument will be apparent to those skilled in the art without further detailed explanation.

*Instrument shown in Figs. 18 to 22*

Figure 18:
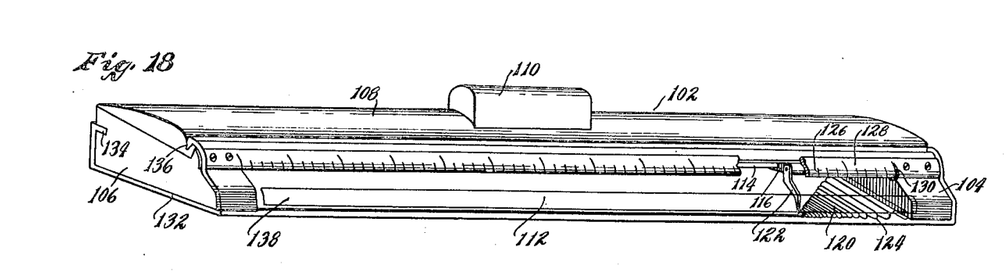
Fig. 18 is a perspective view of another instrument embodying the invention, the construction being somewhat similar to that shown schematically in Figs. 8 and 9.
Figure 19:
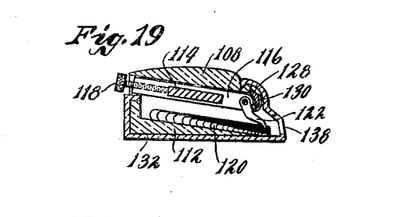
Fig. 19 is a transverse vertical sectional view through the instrument shown in Fig. 18.
Figure 20:
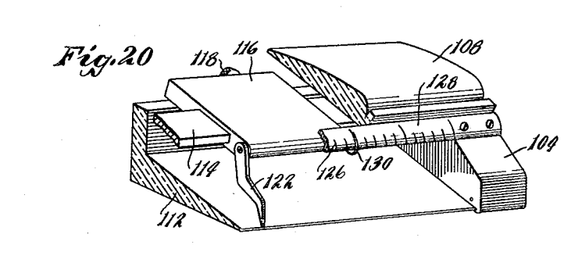
Fig. 20 is an enlarged perspective view of the right hand portion of the instrument shown in Fig. 18 with some of the parts broken away and shown in section. The spring is omitted.
Figure 21:
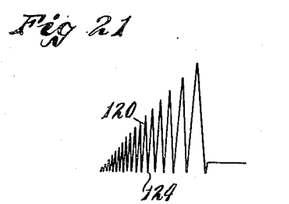
Fig. 21 is a schematic view of the spring constituting a part of the instrument shown in Fig. 18.
Figure 22:
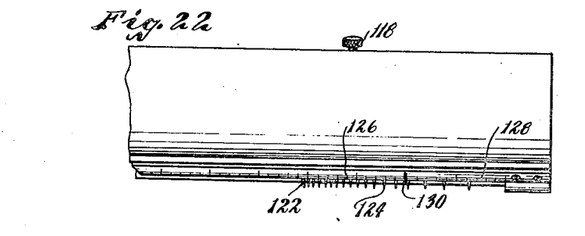
Fig. 22 is a plan view of the right hand portion of the instrument shown in Fig. 18 with the shield removed and with the parts in different positions of adjustment.

Fig. 18 shows an instrument embodying the invention and similar in principle to the schematic showing in Figs. 8 and 9. This instrument is designated in its entirety by the reference character 102. The instrument 102 comprises an elongated base having a flat bottom face and preferably formed of several connected parts. As shown, the base comprises two similar spaced end members 104 and 106. The end members 104 and 106 are connected by a longitudinal cover 108 provided with a handle 110 and are also connected by a longitudinal shelf member 112 having a transversely inclined top surface. The base is provided with a suitable longitudinal guideway which is preferably in the form of a guide rail 114. The guide rail is below the cover 108 and above the shelf member 112. A longitudinally movable slide 116 is provided which is guided by the guideway and when the guideway is in the form of a rail 114 the slide has a longitudinal opening therein which receives and fits the guide rail. A clamping screw 118 is provided on the slide, the head of this screw projecting at the rear so that it can be manually engaged not only for loosening or tightening the screw, but also for moving the slide along the rail.

An extensible coil spring 120 is provided corresponding in function to the coil spring 46 shown in Figs. 8 and 9. This spring is connected at its right end to the end member 104 which constitutes a supporting member corresponding to the member 42 shown in Fig. 8. The spring is connected at its left end with an arm 122 connected with or formed as a part of the slide 116, the slide and arm constituting a movable supporting member corresponding in function to the member 44 shown in Figs. 8 and 9. It will be noted that there is a space between the cover 108 and the shelf member 112, this space constituting a recess at the front of the base for receiving the spring 120.

The front portions 124 of the spring 120 constitute graduations and the convolutions or graduations, instead of being spaced uniformly as shown in Figs. 10 to 17, are spaced non-uniformly in accordance with a predetermined pattern or formula. As shown, the convolutions or graduations 124 are spaced in accordance with a logarithmic scale, but the invention is not necessarily so limited. The slide engages the adjacent end member to prevent movement of the slide toward the right beyond the position shown in Figs. 18 and 20.

As already fully explained in connection with Figs. 8 and 9, the several convolutions of the spring 120 are of successively different sizes so that upon elongation of the spring the increase in the spacings between each two adjacent convolutions is exactly proportionate to the increase in the total spring length. The spring 120 is shown schematically in Fig. 21, but it will be understood that the drawing does not necessarily represent the exact variations in the sizes of the convolutions. The convolutions of the spring 120 are not circular but are flattened so that the graduation portions 124 thereof are transversely narrow. The graduation portions 124 of the spring are in a straight longitudinal line and the spring is so located with respect to the base and the slide that the said graduation portions are closely adjacent the front of the base and closely adjacent the bottom plane of the base, being thus conveniently accessible. As shown, the graduation portions 124 project slightly beyond the front edge of the base. The upper front portions of the convolutions are inclined upward and rearward from the said narrow graduation portions, and as shown the lower inner portions of the spring are also inclined upward and rearward from the said graduation portions. The flat bottom portion of the spring 120 is supported upon the top surface of the shelf member 112 which holds the spring in proper position.

It will be observed that the movable end of the spring 120 is conected with the slide 116 at the end thereof which is remote from the fixed end of the spring. Thus the slide does not extend to any substantial extent beyond the spring and the overall length of the instrument is kept at a minimum.

When the clamping screw 118 is disengaged the slide 116 can be moved along the guide rail 114 so as to elongate the spring 120 to any desired extent within the limits of the instrument, and by means of the screw the slide may be held in its adjusted position. After adjusting the length of the spring by moving the slide as described, it may be desirable to vibrate the instrument slightly to insure the proper spacing of the convolutions 124 and to avoid any inaccuracy of spacing which might otherwise result from frictional drag on the surface of the shelf member 112.

In order that the slide 116 may be conveniently and accurately set for any desired degree of elongation of the spring, there is provided a scale 126 which may be carried by a bar 128. This bar is secured to the end members 104 and 106 and is located at the front of the base. The slide 116 carries an indicator 130 which is positioned to cooperate with the scale 126.

It may be desirable to provide the intrument 102 with a shield for protecting the delicate spring 120, this shield being preferably readily removable to facilitate use of the instrument. As shown, there is a shield 132 which extends throughout the entire length of the base and which partly surrounds the base as clearly shown in Fig. 18. A portion of the shield extends across the bottom of the base and other portions engage the sides of the base, being provided with tongues 134 and 136 which fit longitudinal grooves in the base. The shield is longitudinally movable with respect to the base so that it can be readily removed when desired. It is not always necessary to remove the shield before the instrument is used and in order that limited access may be had to the spring 120 and also to the scale 126 the shield is provided with a longitudinal opening 138 in the front.

The instrument 102 may be used to establish a logarithmic scale of any desired length within the limits of the instrument. Fig. 18 shows the spring 120 at its minimum length and the convolutions or graduations 124 constitute a logarithmic scale of minimum length. A logarithmic scale of any longer length can be established by moving the slide toward the right and elongating the spring, the ratios of the spacings between the several graduations remaining constant and the several graduations representing a logarithmic scale notwithstanding the increase in length. The logarithmic scale as established for any setting can be transferred to a drawing or otherwise by means of dividers inserted through the opening 138 in the shield 132. When the shield is removed the base may be placed directly on a drawing and the established logarithmic scale can be transferred directly to the drawing.

Numerous uses of the instrument 102 will be obvious. For instance, in plotting certain charts or graphs it may be desirable to interpolate intermediate points between two established points, such interpolation to be in accordance with a logarithmic scale. This can readily be accomplished by locating the instrument so that two selected convolutions are in register with the said established points, the instrument having been set to provide a required number of convolutions between the said selected convolutions.

*Instrument shown in Figs. 23 to 30*

Figure 23:
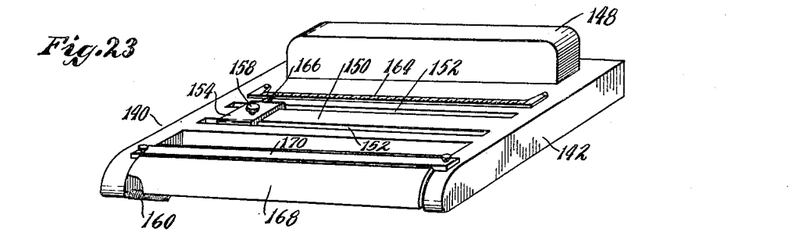
Fig. 23 is a perspective view of another instrument embodying the invention, this view being taken looking downward from the front.
Figure 24:
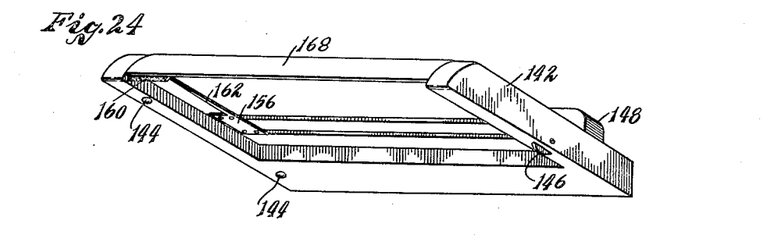
Fig. 24 is a perspective view of the instrument shown in Fig. 23, this view being taken looking upward from the front.

Figs. 23 and 24 show an instrument embodying the invention and similar in principle to the schematic showing in Figs. 3 and 4 and to the more complete showing in Figs. 10 to 17. This instrument is designated in its entirety by the reference character 140. The instrument 140 comprises a relatively thin rectangular base 142 which is adapted to be supported on a flat surface. The base may rest directly on the said flat surface but preferably it is supported indirectly thereon by means of ball points 144, 144 and by means of a small roller 146. The base is provided with a handle 148 by means of which it may be conveniently manipulated.

The base is provided with a suitable longitudinal guideway which is preferably an integral cross bar 150 formed between two slots 152, 152. A slide 154 is movable along the cross bar 150 and is held in place by means of a flat member 156 at the bottom thereof. A clamping screw 158 is provided on the slide and the lower end of this screw is engageable with the cross bar 150 to clamp the slide in any position to which it may be moved.

The base 142 is provided at its front side with a longitudinal recess and an extensible coil spring 160 is provided which is located in this recess. This spring corresponds in function to the coil spring 22 shown in Figs. 3 and 4, and to the coil spring 72 shown in Figs. 10 to 17. The spring 160 is connected at its left end with the base 142 and is connected at its right end with an arm 162 extending forward from the member 156 at the bottom of the slide 154. Thus the spring 160 can be adjusted in length by moving the slide. The convolutions of the spring 160 are not circular but are so formed as to provide transversely narrow graduation portions. The spring is so located with respect to the base and slide that the narrow graduation portions are closely adjacent the front edge of the base and extend to the bottom plane of the base. Thus the graduation portions are positioned to actually engage the flat surface on which the base 142 is supported by means of the ball points 144, 144 and the roller 146. The upper front portions of the convolutions and the lower rear portions thereof preferably extend upward and rearward from the said narrow graduation portions.

It will be observed that the movable end of the spring 160 is connected with the slide 154 at the end thereof which is remote from the fixed end of the spring. Thus the slide does not extend to any substantial extent beyond the movable end of the spring and the overall length of the instrument is kept at a minimum.

The convolutions in the spring 160 are shown as being uniformly spaced, but they may be spaced nonuniformly in accordance with a predetermined pattern, as for instance logarithmically. Preferably the spacings between the convolutions are very much greater than those of the spring 72 shown in Figs. 10 to 17. While I do not so limit myself, it may be assumed by way of illustration that the spring 160 has 50 convolutions in its minimum length, which may be one inch. When the clamping screw 158 is disengaged the slide 154 can be moved along the cross bar 159 so as to elongate the spring 160 to any desired extent within the limits of the instrument to reduce the number of convolutions per inch. By means of the screw the slide may be held in its adjusted position.

In order that the slide 154 may be conveniently and accurately set to provide any desired number of convolutions per unit of length a graduated scale 164 is provided on the base and the slide 154 has a pointer 166 cooperating with the scale. The scale preferably reads directly in convolutions per unit of length.

The instrument 140 is intended to be used for marking parallel lines on a drawing, such lines to be spaced apart by any desired distance within the limits of the instrument. To this end I preferably provide means enabling the spring convolutions at the bottoms thereof to draw lines on the paper or other flat surface on which the base 142 may be held. Preferably, the means enabling the convolutions to draw lines comprises an inking pad 168 formed of felt or other suitable material and clamped to the base 142 by means of a clamping bar 170. The pad 168 extends over the top and down the sides of the spring but terminates above the plane on which the base is supported. The felt pad 168 carries ink of a suitable quality which is fed to the convolutions of the spring 160 and flows by capilliary action downward along the convolutions from which it is transferred to the paper when the base is moved.

Figures 28, 29:
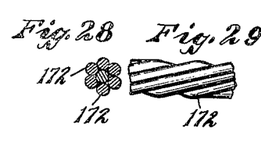
Figs. 28 and 29 are cross-sectional and side views respectively of a strand of material which may be used for forming the spring shown in Figs. 23 and 24.

In order to assist the flow of the ink by capillary action, the spring 160 may be formed of a composite strand such as shown in Figs. 28 and 29. As shown, this strand comprises seven very small wires 172 twisted together. The spaces between the wires 172 provide for the capillary flow of the ink.

Figure 30:
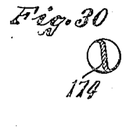
Figs. 30 and 31 are cross-sectional and side views respectively of a different strand of material which may be used for forming the spring shown in Figs. 23 and 24.
Figure 31:
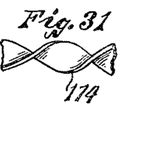

As an alternative to the construction shown in Figs. 28 and 29 I may provide a strand as shown in Figs. 30 and 31 which consists of a single flat wire 174 which is twisted as shown.

Figure 25:
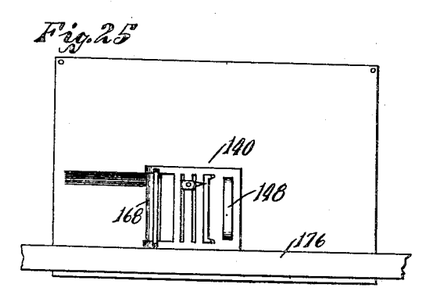
Figs. 25, 26 and 27 are plan views illustrating the manner of use of the instrument shown in Figs. 23 and 24.

In use the slide 154 is adjusted to provide the desired spacing between the convolutions of the spring 160. If it is desired to draw horizontal lines the instrument 140 can be guided by a T-square 176 as shown in Fig. 25, the instrument being moved in a direction perpendicular to the axis of the spring. If a number of lines smaller than the total number of convolutions is desired, a narrower inking pad may be substituted for the pad 168, or a shield may be attached to the bottom of the base to block off some of the convolutions.

Figure 26:
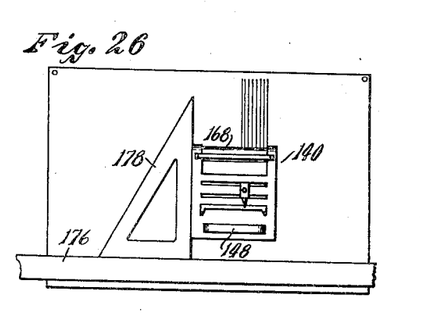

If it is desired to draw vertical lines or lines at any desired angle, this can be done by guiding the edge of the instrument along a triangle 178 or along a protractor or other instrument providing the desired angle.

Figure 27:
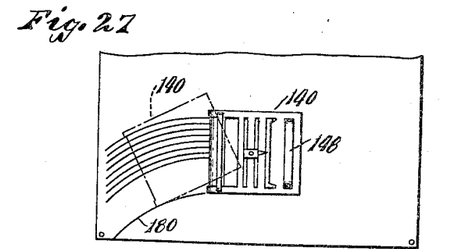

It may be desirable to draw a plurality of curved lines and in this case the instrument may be guided by a suitable template having the desired curvature, or by a line 180 previously drawn on the paper. In following a curve the instrument is so controlled manually that the axis of the spring is perpendicular or substantially perpendicular to the curve which is to be reproduced.

What I claim is:

1. In an instrument of the class described, the combination of a base having a longitudinal guideway thereon, a slide movable along the guideway, and a longitudinally extending coil spring which has its convolutions longitudinally spaced in conformity with a predetermined pattern and which is connected at one end with the base and at the opposite end with the slide so that the spacings between all of the convolutions are varied when the total spring lenth is varied by movement of the slide, the said spring having its several convolutions ovoidal in shape with transversely wide portions at the rear and with transversely narrow portions at the front constituting graduations and the said spring being located with respect to the base and the slide so that the said narrow graduation portions of the convolutions are closely adjacent the longitudinal front edge portion of the base and are closely adjacent the bottom plane of the base and so that portions of the convolutions adjacent the said graduation portions are inclined upwardly from the said plane and toward the central portion of the base.

2. In an instrument of the class described, the combination of a base having a longitudinal guideway thereon, a slide movable along the guideway, and a longitudinally extending coil spring which has its convolutions longitudinally spaced in conformity with a predetermined pattern and which is connected at one end with the base and at the opposite end with the slide so that the spacings between all of the convolutions are varied when the total spring length is varied by movement of the slide, the said spring having its several convolutions ovoidal in shape with transversely wide portions at the rear and with transversely narrow portions at the front constituting graduations and the said spring being located with respect to the base and the slide so that the said narrow graduation portions of the convolutions are laterally beyond the longitudinal front edge portion of the base and are closely adjacent the bottom plane of the base and so that portions of the convolutions adjacent the said graduation portions are inclined upwardly from the said plane and toward the central portion of the base.

3. In an instrument of the class described, the combination of a base having a longitudinal guideway thereon spaced rearwardly from the front thereof, a slide movable along the guideway and spaced rearwardly from the front of the base, and a longitudinally extending coil spring spaced forwardly from the guideway and the slide and connected at one end with the base and connected at the opposite end with the end of the slide which is remote from the first said end of the spring, the said spring having its convolutions longitudinally spaced in conformity with a predetermined pattern so that the spacings between all of the convolutions are varied when the total spring length is varied by movement of the slide and the several convolutions of the spring having similar transversely narrow portions constituting graduations which are closely adjacent the front edge of the base and closely adjacent the bottom plane of the base.

4. In an instrument of the class described, the combination of a base having a longitudinal guideway thereon spaced rearwardly from the front thereof, a slide movable along the guideway and spaced rearwardly from the front of the base, a forwardly projecting arm on the slide having its projecting end near the front of the base and near the bottom plane thereof, and a longitudinally extending coil spring spaced forwardly from the guideway and the slide and connected at one end with the base and connected at the opposite end with the projecting end of the arm, the said spring having its convolutions longitudinally spaced in conformity with a predetermined pattern so that the spacings between all of the convolutions are varied when the total spring length is varied by movement of the slide and the several convolutions of the spring having similar transversely narrow portions constituting graduations which are closely adjacent the front edge of the base and closely adjacent the bottom plane of the base.

5. The combination in an instrument of the class described, of a base having a longitudinal guideway thereon and having an open sided longitudinal recess along one side, a slide movable along the guideway, a longitudinally extending extensible coil spring positioned within the recess in the base and engaged at one end with the said base and engaged at the other end with the said slide, all portions of the said spring from end to end thereof being increased in length when the total length thereof is increased in accordance with the movement of the slide and the lateral portions of the convolutions of the said spring constituting graduations which are longitudinally spaced in conformity with a predetermined pattern and the spacings between which are increased when the total length of the spring is increased, and a removable shield partly enclosing the base and extending along the recess in the base to protect the said spring.

6. The combination in an instrument of the class described, of a base having a flat bottom face, the said base having a longitudinal guideway thereon and being provided along one side and near the bottom with a longitudinal recess, a slide movable along the guideway on the base, a longitudinally extending extensible coil spring engaged at one end with the said base and engaged at the other end with the said slide, all portions of the said spring from end to end thereof being increased in length when the total length thereof is increased in accordance with the movement of the slide and the said spring being within the recess and having portions of its convolutions closely adjacent the plane of the flat bottom face of the base which said portions of the convolutions constitute graduations which are longitudinally spaced in conformity with a predetermined pattern and the spacings between which are increased when the total length of the spring is increased, and a shield partly enclosing the base and having a longitudinal opening adjacent the recess therein to permit access to the said spring.

7. The combination in an instrument of the class described, of a base having a flat bottom face, the said base having a longitudinal guideway thereon and being provided along one side and near the bottom with a longitudinal recess, a slide movable along the guideway on the base, a longitudinally extending extensible coil spring engaged at one end with the said base and engaged at the other end with the said slide, all portions of the said spring from end to end thereof being increased in length when the total length thereof is increased in accordance with the movement of the slide and the said spring being within the recess and having portions of its convolutions closely adjacent the plane of the flat bottom face of the base which said portions of the convolutions constitute graduations which are longitudinally spaced in conformity with a predetermined pattern and the spacings between which are increased when the total length of the spring is increased, and a shield partly surrounding the base and slidably engaged therewith to permit removal by relative longitudinal movement, the said shield having a longitudinal opening therein adjacent the recess in the base to permit access to the said spring.

8. In an instrument of the class described, the combination of two similar spaced end members having their bottom faces in a common plane, a longitudinal cover connecting the end members, a longitudinal guide rail below the cover and carried by the end members, two longitudinal connecting rails extending between the end members near the bottom thereof and at the front and rear of the guide rail, a slide movable along the guide rail and including an arm projecting laterally between the cover and the front connecting rail, and a longitudinally extending extensible coil spring beneath the cover at the outer side of and closely adjacent the said front rail and being engaged at one end with one end member and engaged at the other end with the projecting arm of the slide, all portions of the said spring from end to end thereof being increased in length when the total length thereof is increased in accordance with the movement of the slide and the convolutions of the said spring constituting graduations which are longitudinally spaced in conformity with a predetermined pattern and the spacings between which are increased when the total length of the spring is increased.

9. In an instrument of the class described, the combination of two similar spaced end members having their bottom faces in a common plane, a longitudinal cover connecting the end members, a longitudinal guide rail below the cover and carried by the end members, two longitudinal connecting rails extending between the end members near the bottom thereof and at the front and rear of the guide rail, a slide movable along the guide rail and including an arm projecting laterally between the cover and the front connecting rail, a longitudinally extending extensible coil spring beneath the cover at the outer side of and closely adjacent the said front rail and being engaged at one end with one end member and engaged at the other end with the projecting arm of the slide, all portions of the said spring from end to end thereof being increased in length when the total length thereof is increased in accordance with the movement of the slide and the convolutions of the said spring constituting graduations which are longitudinally spaced in conformity with a predetermined pattern and the spacings between which are increased when the total length of the spring is increased, a longitudinal scale supporting member below the guide rail and below the slide and supported by the end members, an indicator on the slide below the scale supporting member, and two longitudinal scales one on the scale supporting member and one on one of the connecting rails and both cooperating with the indicator on the slide, one scale indicating the amount of slide movement measured in units of length and the other indicating the number of spring graduations per unit of length.

10. In an instrument of the class described, the combination of a base having a longitudinal guideway thereon, a slide movable along the guideway, a longitudinally extending extensible coil spring formed of steel and engaged at one end with the said base and at the other end with the said slide, all portions of the said spring from end to end thereof being increased in length when the total length thereof is increased in accordance with the movement of the slide and the convolutions of the spring constituting graduations which are longitudinally spaced in conformity with a predetermined pattern and the spacings between which are increased when the total length of the spring is increased, and a magnet on the base above the spring to minimize sagging thereof.

11. In an instrument of the class described, the combination of two similar spaced end members having their bottom faces in a common plane, a longitudinal cover connecting the end members and constituting a magnet with one pole along one edge thereof, a longitudinal guide rail below the cover and carried by the end members, a slide movable along the guide rail, and a longitudinally extending extensible coil spring engaged at one end with one end member and engaged at the other end with the said slide, the said spring being beneath the said pole of the magnet at one side of the guide rail and slide and having portions of its convolutions closely adjacent the said bottom plane of the end members and all portions of the said spring from end to end thereof being increased in length when the total length thereof is increased in accordance with the movement of the slide and the convolutions of the said spring constituting graduations which are longitudinally spaced in conformity with a predetermined pattern and the spacings between which are increased when the total length of the spring is increased.

12. In an instrument of the class described, the combination of two similar spaced end members having their bottom faces in a common plane, a longitudinal cover connecting the end members, a longitudinal guide rail below the cover and carried by the end members, a slide movable along the guide rail, a longitudinally extending extensible coil spring engaged at one end with one end member and engaged at the other end with the said slide, the said spring being beneath the cover at one side of the guide rail and slide and having portions of its convolutions closely adjacent the said bottom plane of the end members and all portions of the said spring from end to end thereof being increased in length when the total length thereof is increased in accordance with the movement of the slide and the convolutions of the said spring constituting graduations which are longitudinally spaced in conformity with a predetermined pattern and the spacings between which are increased when the total length of the spring is increased, a downwardly facing longitudinally extending scale on the base adjacent the slide and cooperating therewith to indicate the amount of movement of the slide, and a removable transparent shield partly enclosing the end members and the parts carried thereby and extending along the spring to protect it, the said downwardly facing scale being visible through the transparent shield.

13. In an instrument of the class described, the combination of two similar spaced end members having their bottom faces in a common plane, a longitudinal cover connecting the end members, a longitudinal guide rail below the cover and carried by the end members, a slide movable along the guide rail, a longitudinally extending extensible coil spring engaged at one end with one end member and engaged at the other end with the said slide, the said spring being beneath the cover at one side of the guide rail and slide and having portions of its convolutions closely adjacent the said bottom plane of the end members and all portions of the said spring from end to end thereof being increased in length when the total length thereof is increased in accordance with the movement of the slide and the convolutions of the said spring constituting graduations which are longitudinally spaced in conformity with a predetermined pattern and the spacings between which are increased when the total length of the spring is increased, a downwardly facing longitudinally extending scale adjacent the slide and cooperating therewith to indicate the amount of movement of the slide and to thus indicate the increase in the total length of the spring, and a removable shield partly enclosing the end members and the parts carried thereby and extending along the spring to protect it, the said shield having a longitudinal opening in one side thereof adjacent the spring to permit access to the said spring.

14. The combination in an instrument of the class described, of two supporting members one of which is movable longitudinally relatively to the other, and a longitudinally extending extensible coil spring engaged at its ends with the said supporting members so that its total length is increased in accordance with the movement of the relatively movable member, the said spring having convolutions spaced nonuniformly in conformity with a predetermined pattern and constituting graduations along one side which graduations are in a straight line parallel to the direction of spring extension and the spring being so formed that the spacing between each two adjacent graduations is increased proportionately to increases in total spring length.

15. The combination in an instrument of the class described, of two supporting members one of which is movable longitudinally relatively to the other, and a longitudinally extending extensible coil spring engaged at its ends with the said supporting members so that its total length is increased in accordance with the movement of the relatively movable member, the said spring having convolutions spaced nonuniformly in conformity with a logarithmic scale and constituting graduations and the spring being so formed that the spacing between each two adjacent graduations is increased proportionately to increases in total spring length.

16. The combination in an instrument of the class described, of two supporting members one of which is movable longitudinally relatively to the other, and a longitudinally extending extensible coil spring engaged at its ends with the said supporting members so that its total length is increased in accordance with the movement of the relatively movable member, the said spring having convolutions spaced nonuniformly in conformity with a logarithmic scale and constituting graduations and the spring having its successive convolutions from one end to the other of progressively increasing sizes so that the spacing between each two adjacent graduations is increased proportionately to increases in total spring length.

17. In an instrument of the class described, the combination of a base having a longitudinal guideway thereon, a slide movable along the guideway, and a longitudinally extending coil spring which has its convolutions longitudinally spaced nonuniformly in conformity with a logarithmic scale and which is connected at one end with the base and at the opposite end with the slide so that the spacings between all of the convolutions are varied when the total spring length is varied by movement of the slide, the several convolutions of the spring having similar narrow portions constituting graduations and the said spring being located with respect to the base and the slide so that the said graduation portions of the convolutions are laterally beyond a longitudinal edge portion of the base and are immediately adjacent the bottom plane of the base.

18. In an instrument of the class described, the combination of a base having a longitudinal guideway thereon, a slide movable along the guideway, a longitudinally extending coil spring which has flat convolutions longitudinally spaced nonuniformly in conformity with a predetermined pattern and which is connected at one end with the base and at the opposite end with the slide so that the spacings between all of the convolutions are varied when the total spring length is varied by movement of the slide, the front portions of the several convolutions of the spring being in a straight longitudinal line and constituting graduations and the said convolutions increasing successively in size from one end of the spring to the other so that the spacing between each two adjacent convolutions is increased proportionately to increases in total spring length.

19. The combination in an instrument of the class described, of a base having a longitudinal shelf near the bottom thereof and having a longitudinal guideway adjacent the shelf, a slide movable along the guideway, and a longitudinally extending extensible coil spring having flat convolutions and engaged at its respective ends with one end member and with the slide so that its total length is increased in accordance with movements of the slide, the flat convolutions of the spring being positioned so that they may be supported on the said shelf and the said convolutions at the front side of the spring constituting graduations which are spaced nonuniformly in conformity with a logarithmic scale and the said convolutions increasing successively in size from one end of the spring to the other so that the spacing between each two adjacent convolutions is increased proportionately to increases in total spring length.

20. The combination in an instrument of the class described, of a base having a longitudinal shelf near the bottom thereof and having a longitudinal guideway adjacent the shelf, a slide movable along the guideway, a longitudinally extending extensible coil spring having flat convolutions and engaged at its respective ends with one end member and with the slide so that its total length is increased in accordance with movements of the slide, the flat convolutions of the spring being positioned so that they may be supported on the said shelf and the said convolutions at the front side of the spring constituting graduations which are spaced nonuniformly in conformity with a logarithmic scale and the scale convolutions increasing successively in size from one end of the spring to the other so that the spacing between each two adjacent convolutions is increased proportionately to increases in total spring length, and a bar near the front and above the shelf carrying a scale cooperating with the slide to indicate the amount of movement of the slide and to thus indicate the increase in total length of the spring.

21. An instrument of the class described comprising in combination, a base adapted to be supported on a flat surface, a coil spring carried by the base and so positioned that the bottoms of the convolutions thereof may engage a flat surface supporting the base, and means enabling the spring convolutions at the bottoms thereof to draw lines on the said flat surface when the base is moved along the said surface in a direction substantially perpendicular to the axis of the spring.

22. An instrument of the class described comprising in combination, a base adapted to be supported on a flat surface, a coil spring carried by the base and so positioned that the bottoms of the convolutions thereof may engage a flat surface supporting the base, and an inking pad engaging the spring convolutions for supplying ink thereto to enable the said convolutions at the bottoms thereof to draw lines on the said flat surface when the base is moved along the said surface in a direction substantially perpendicular to the axis of the spring.

23. An instrument of the class described comprising in combination, a base adapted to be supported on a flat surface and provided with a longitudinal guideway, a slide movable along the guideway, a longitudinally extending extensible coil spring engaged at one end with the base and engaged at the other end with the slide and so positioned that the bottoms of the convolutions thereof may engage a flat surface supporting the base, all portions of the said spring from end to end thereof being increased in length when the total length thereof is increased in accordance with the movement of the slide and the convolutions of the said spring constituting graduations which are longitudinally spaced in conformity with a predetermined pattern and the spacings between which are increased when the total length of the spring is increased, and means enabling the spring convolutions at the bottoms thereof to draw lines on the said flat surface when the base is moved along the said surface in a direction substantially perpendicular to the axis of the spring.

24. An instrument of the class described comprising in combination, a base adapted to be supported on a flat surface and provided with a longitudinal guideway, a slide movable along the guideway, a longitudinally extending extensible coil spring engaged at one end with the base and engaged at the other end with the slide and so positioned that the bottoms of the convolutions thereof may engage a flat surface supporting the base, all portions of the said spring from end to end thereof being increased in length when the total length thereof is increased in accordance with the movement of the slide and the convolutions of the said spring constituting graduations which are longitudinally spaced in conformity with a predetermined pattern and the spacings between which are increased when the total length of the spring is increased, and an inking pad engaging the spring convolutions for supplying ink thereto to enable the said convolutions at the bottoms thereof to draw lines on the said flat surface when the base is moved along the said surface in a direction substantially perpendicular to the axis of the spring.

25. An instrument of the class described comprising in combination, a base adapted to be supported on a flat surface and provided with a longitudinal guideway, a slide movable along the guideway, a longitudinally extending extensible coil spring engaged at one end with the base and engaged at the other end with the slide and so positioned that the bottoms of the convolutions thereof may engage a flat surface supporting the base, the said spring having uniformly spaced convolutions which constitute graduations and the spacings between which are varied proportionately to the variations in total length, means enabling the spring convolutions at the bottoms thereof to draw lines on the said flat surface when the base is moved along the said surface in a direction substantially perpendicular to the axis of the spring, and a scale on the base for indicating the amount of longitudinal movement of the slide, the said scale being graduated to indicate the number of spring convolutions per unit of length for all increases in total length.

HEINZ JOSEPH GERBER.

REFERENCES CITED

The following references are of record in the file of this patent:

UNITED STATES PATENTS

| Number | Name | Date |
| --- | --- | --- |
| 300,804 | Schild | June 24, 1884 |
| 1,717,596 | Zak | June 18, 1929 |
| 2,307,323 | Laflamme | Jan. 5, 1943 |
| 2,331,298 | Bennett | Oct. 12, 1943 |
| 2,422,745 | Ost | June 24, 1947 |
| 2,526,921 | Ahblom | Oct. 24, 1950 |
| 2,530,955 | Gerber | Nov. 21, 1950 |

FOREIGN PATENTS

| Number | Country | Date |
| --- | --- | --- |
| 257,335 | Italy | Feb. 25, 1928 |
| 526,005 | Great Britain | Sept. 9, 1940 |
| 598,911 | Germany | June 21, 1934 |
| 838,260 | France | Nov. 28, 1938 |